United States Patent
Togita

(10) Patent No.: US 8,306,110 B2
(45) Date of Patent: Nov. 6, 2012

(54) MOVING IMAGE CODING APPARATUS AND METHOD USING COPY PICTURES DEPENDING ON VIRTUAL BUFFER VERIFIER OCCUPANCY

(75) Inventor: Koji Togita, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1004 days.

(21) Appl. No.: 12/326,648

(22) Filed: Dec. 2, 2008

(65) Prior Publication Data

US 2009/0147844 A1 Jun. 11, 2009

(30) Foreign Application Priority Data

Dec. 6, 2007 (JP) ................. 2007-316237

(51) Int. Cl.
*H04N 7/12* (2006.01)
(52) U.S. Cl. ................. 375/240.03
(58) Field of Classification Search .......... 375/130–153, 375/240.01–240.29; 704/500–504; *H04N 7/12, H04N 11/02, 11/04; H04B 1/00, 1/66*
See application file for complete search history.

(56) References Cited

U.S. PATENT DOCUMENTS

| | | | | |
|---|---|---|---|---|
| 6,157,675 A | * | 12/2000 | Mitsuhashi et al. | ..... 375/240.01 |
| 6,347,117 B1 | * | 2/2002 | Kato et al. | ................ 375/240.05 |
| 2006/0171680 A1 | | 8/2006 | Makito | |
| 2009/0190655 A1 | * | 7/2009 | Shimada et al. | ......... 375/240.01 |

FOREIGN PATENT DOCUMENTS

JP 2006-217180 A 8/2006

* cited by examiner

*Primary Examiner* — Jay Patel
*Assistant Examiner* — Jessica Prince
(74) *Attorney, Agent, or Firm* — Canon USA Inc IP Division

(57) ABSTRACT

In a moving image coding apparatus, when a first picture is entropy-coded, if an occupancy of a virtual buffer is below a predetermined position, the first picture is replaced with a copy picture. Further, among succeeding pictures that refer to a reference image corresponding to the first picture for inter picture prediction, a second picture whose quantization has been started or completed is also replaced with the copy picture.

6 Claims, 7 Drawing Sheets

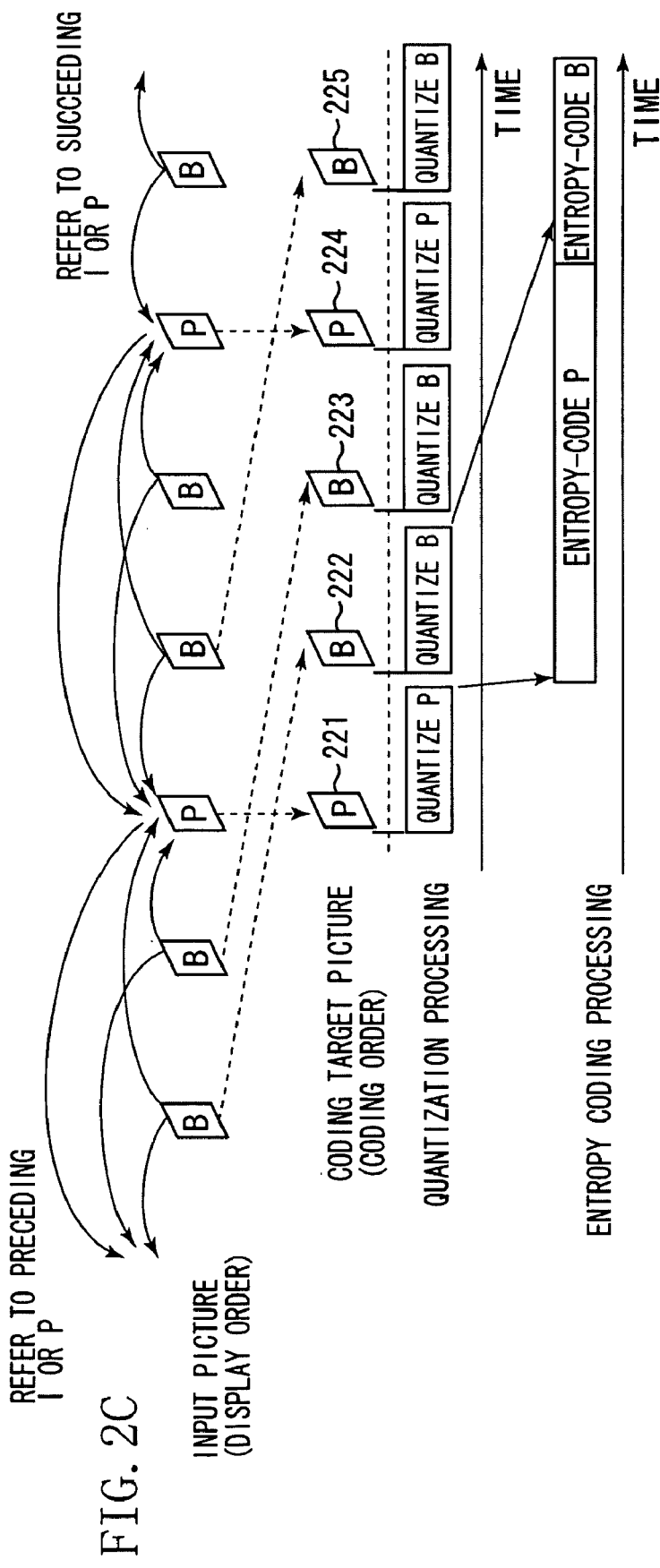
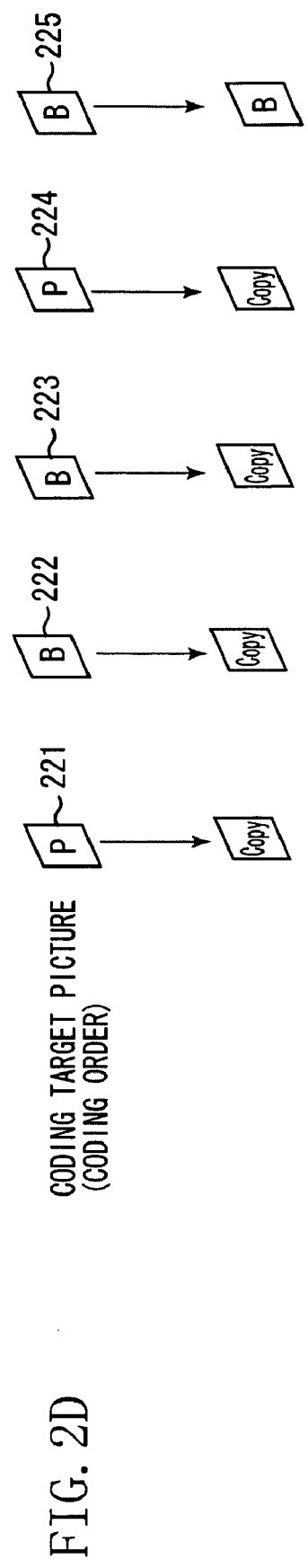
FIG. 2C
FIG. 2D

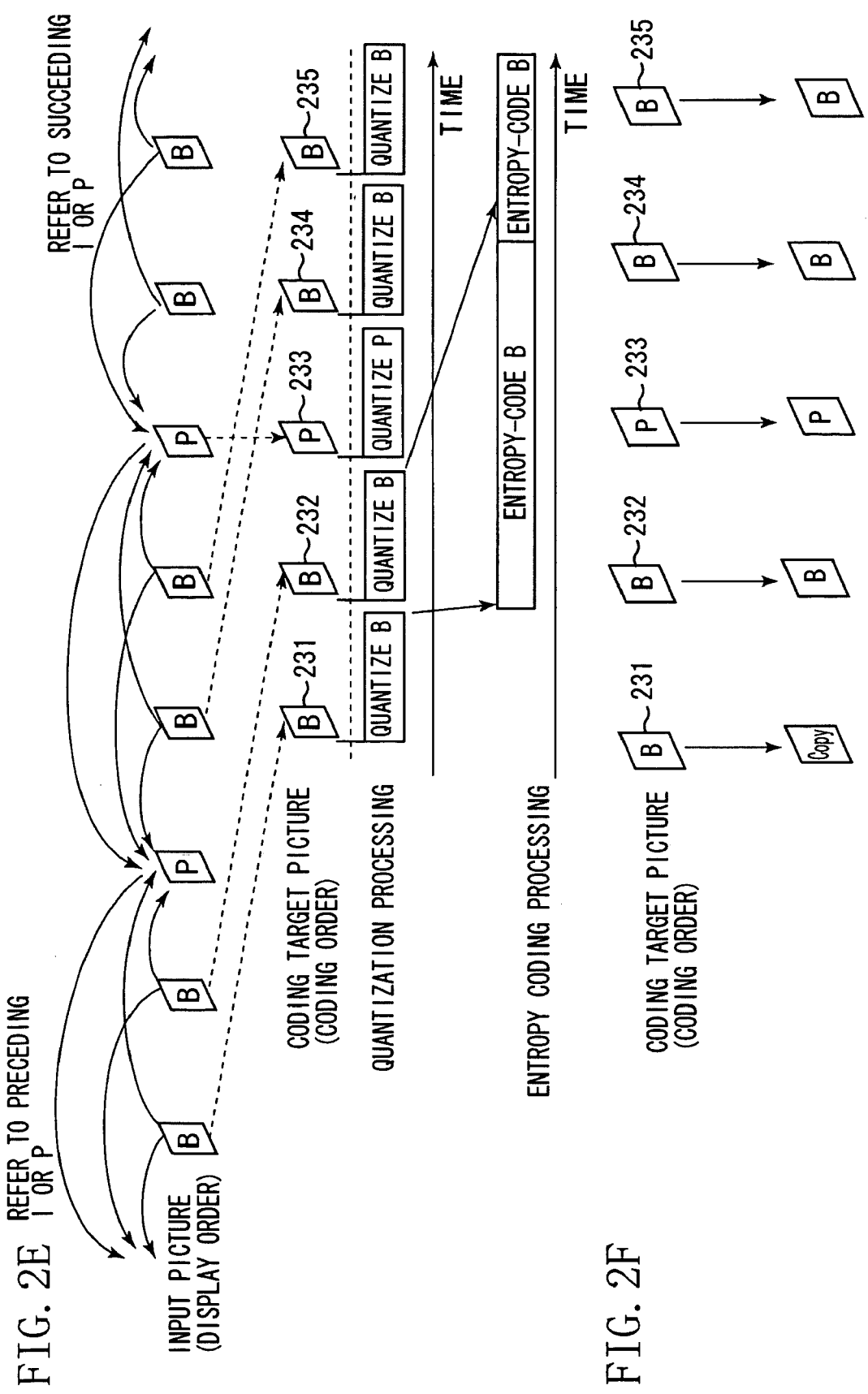

MOVING IMAGE CODING APPARATUS AND METHOD USING COPY PICTURES DEPENDING ON VIRTUAL BUFFER VERIFIER OCCUPANCY

BACKGROUND OF THE INVENTION

1. Field of the Invention

The present invention relates to a moving image coding apparatus and a moving image coding method. More particularly, the present invention relates to a technique suitably used to code moving image data based on a coding method such as H.264.

2. Description of the Related Art

In recent years, video cameras that can record high definition (HD) images using a disk medium, a hard disk, or a memory as a recording medium have been commercially available. Such video cameras can record high-quality video images, while being compact and easy to carry. In view of the above, use of the video cameras is expected to become increasingly widespread in the future. In the video cameras, in order to efficiently record HD images, a video stream compressed and coded using MPEG 4 Part-10: AVC (ISO/IEC 14496-10, known as H.264) is recorded in a recording medium.

A summary of the compression procedure according to the H.264 method is described in detail in the ISO/IEC 14496-10 standard. Further, an image processing apparatus that performs compression and coding processing using the H.264 method is discussed, for example, in Japanese Patent Application Laid-Open No. 2006-217180.

In the H.264 method, in performing the compression and coding, a target code amount is adjusted to an assumed virtual video buffering verifier (VBV) (hereinafter, referred to as virtual buffer). The virtual buffer is defined based on a code generation amount in an entropy-coding and an output code amount.

Further, in the H.264 method, as the entropy-coding method, two types of methods are provided and can be selected. The one is context-based adaptive variable length coding (CAVLC) method based on Huffman code. The other method is context-based adaptive binary arithmetic coding (CABAC) method that uses an arithmetic coding. Especially, the CABAC method emphasizes coding efficiencies, and calculation amounts are large. Accordingly, in the CABAC method, the coding processing requires a lot of time.

The H.264 method is often used to code HD images of 1920×1080 (pixels). Accordingly, as compared to images of a standard definition (SD) of 720×480 (pixels), the number of pixels to be processed in the HD image is six times larger than that in the SD image. Accordingly, in order to code the HD image in real time without increasing the operating frequency, it is required to perform the coding operation in multi-core processing. In view of the above, it is preferable to perform a quantization processing and an entropy-coding processing in synchronization with each other on a picture-by-picture basis. However, it is difficult to perform the entropy-coding processing in multi-core processing because of its characteristic in the processing. Accordingly, the entropy-coding processing and the quantization processing may be performed asynchronously.

In such a case, an entropy-coding of a preceding picture and a quantization of a current picture may be concurrently performed. Accordingly, especially in the CABAC method, when CABAC processing of the preceding picture is finished, a quantization of a succeeding picture has been often started or completed.

Further, in such a case, an actually generated code amount of the preceding picture can be larger than an assumed code amount and an underflow can occur in the virtual buffer. The occurrence of the underflow in the virtual buffer can be found when the CABAC processing of the preceding picture is finished. Then, the coding has already been finished. To solve the problem, in the H.264 method, when the underflow occurs in the virtual buffer, the underflowed picture is replaced with a copy picture.

FIG. 5A is a schematic view illustrating an example when an underflow occurs in a virtual buffer. FIG. 5B is a schematic view illustrating an example of an occupancy of a virtual buffer when an underflowed picture is replaced with a copy picture. A transition of the occupancy in a case where a picture being code-processed is replaced with a copy picture is described with reference to FIGS. 5A and 5B.

If the occupancy becomes lower than a minimum position for a size of a virtual buffer, an underflow occurs in the virtual buffer. As illustrated in FIG. 5A, when the underflow occurs in the virtual buffer, processing to replace a coding target picture (underflowed picture) at that time with a copy picture is performed. By the replacement processing, the occupancy transits to the one as illustrated in FIG. 5B, and a stream breakup and a buffer breakup can be prevented.

FIG. 6 is a schematic view illustrating timing of quantization processing and entropy-coding processing in a case where both processing is asynchronously performed. Processing timing in quantization processing and entropy-coding processing is described with reference to FIG. 6.

In FIG. 6, when a picture is input on a frame-by-frame or a field-by-field basis, processing is performed for each picture in order of quantization processing and entropy-coding processing. However, the timing of the quantization processing and the entropy-coding processing is asynchronous. Therefore, while an entropy-coding processing of a first picture 601 is being performed, entropy-coding processing of a second picture 602, a third picture 603, and a fourth picture 604, which are succeeding pictures, can be performed.

As described above, in the case where the underflow occurs in the virtual buffer and the picture being code-processed is replaced with the copy picture, the quantization processing of the succeeding pictures have been started while the entropy-coding processing of the picture is being performed. Accordingly, if the picture as to which the underflow occurs in the virtual is a reference picture that is referred to in an inter picture prediction, the following problems can occur. Because the reference picture is replaced with the copy picture, the already quantized succeeding pictures perform erroneous motion compensations. Thus, when the pictures are decoded, an error may occur, and the deteriorated image may be displayed. Further, at the time the underflow occurs in the virtual buffer, the quantization processing of the succeeding pictures have already been started. Accordingly, it is difficult to perform the quantization processing of the succeeding pictures again by using the replaced copy picture as a new reference picture to continue the real-time coding of the moving image.

SUMMARY OF THE INVENTION

The present invention is directed to reduce an erroneous motion compensation and to prevent the display of the deteriorated image.

Further, the present invention is directed to continue real-time coding of a moving image without performing quantization processing of succeeding pictures again.

According to an aspect of the present invention, a moving image coding apparatus configured to perform coding using inter picture prediction includes a quantization unit configured to quantize a difference value between input image data and prediction image data, a coding unit configured to perform an entropy-coding of the difference value quantized by the quantization unit, a buffer occupancy control unit configured to update an occupancy of a virtual buffer that is a virtual buffer in a decoder based on a code amount generated by the coding unit and control the quantization unit based on the occupancy of the virtual buffer, and a copy picture generation unit configured to replace a first picture with a copy picture if the occupancy of the virtual buffer is below a predetermined position when the first picture is coded by the coding unit, and replace, among succeeding pictures that refer to a reference image corresponding to the first picture for the inter picture prediction, a second picture whose quantization has been started or completed by the quantization unit, with the copy picture.

According to another aspect of the present invention, a moving image coding method for performing coding using inter picture prediction includes quantizing a difference value between input image data and prediction image data, entropy-coding the quantized difference value, updating an occupancy of a virtual buffer that is a virtual buffer in a decoder based on a code amount generated by the entropy-coding and controlling the quantization based on the occupancy of the virtual buffer, and replacing a first picture with a copy picture if the occupancy of the virtual buffer is below a predetermined position when the first picture is entropy-coded, and replacing, among succeeding pictures that refer to a reference image corresponding to the first picture for the inter picture prediction, a second picture whose quantization has been started or completed, with the copy picture.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2C and 2D are views illustrating an example of copy picture replacement processing that is performed when an underflow occurs in a virtual buffer in an entropy-coding of a P picture according to the first exemplary embodiment of the present invention.

FIGS. 2E and 2F are views illustrating an example of copy picture replacement processing that is performed when an underflow occurs in a virtual buffer in an entropy-coding of a B picture according to the first exemplary embodiment of the present invention.

DETAILED DESCRIPTION OF THE EMBODIMENTS

Various exemplary embodiments, features, and aspects of the invention will be described in detail below with reference to the drawings.

Figure 1:
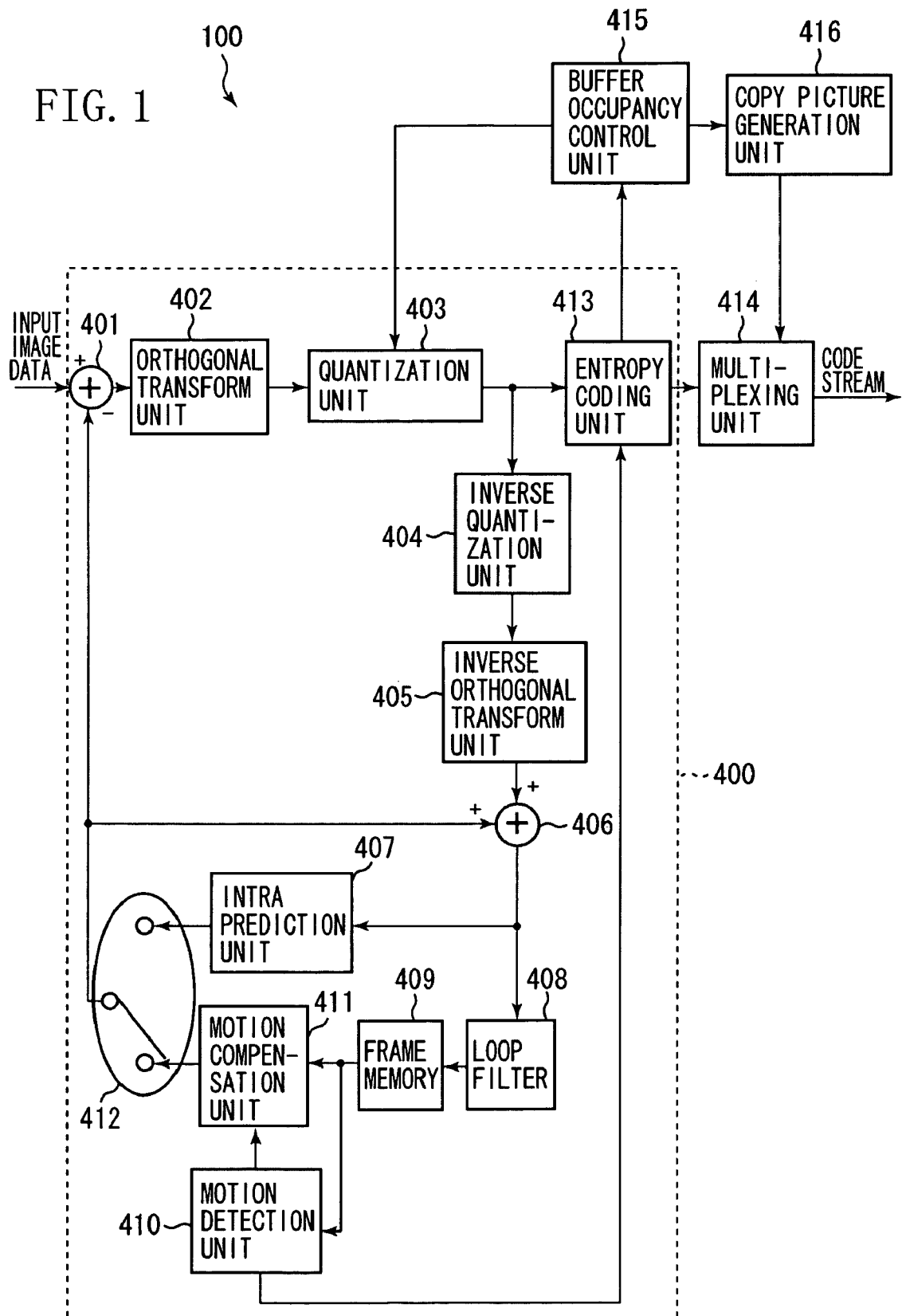
FIG. 1 is a block diagram illustrating an exemplary configuration of a moving image coding apparatus according to a first exemplary embodiment of the present invention.

FIG. 1 is a block diagram illustrating an exemplary configuration of a moving image coding apparatus according to a first exemplary embodiment of the present invention. Coding processing based on H.264 standard using a moving image coding apparatus 100 is described with reference to FIG. 1. In the first exemplary embodiment, the H.264 method is described as an example. However, any coding method that performs similar coding can be employed.

A coding unit 400 codes input image data for each macro-block that is a unit block in coding, and outputs a code stream. To code the data, one of an intra-picture prediction (hereinafter, referred to as intra prediction) and an inter-picture prediction (hereinafter, referred to as inter prediction) is used.

A subtracter 401 calculates a difference value between a pixel value of input image data and a reference pixel value (prediction image data) used for prediction, and outputs the value to an orthogonal transform unit 402. The orthogonal transform unit 402 converts the difference value input from the subtracter 401 into, for example, a discrete cosine coefficient, and outputs the value to a quantization unit 403. The quantization unit 403 sets quantization parameters based on a target code amount instructed by a buffer occupancy control unit 415, and quantizes the discrete cosine coefficient input from the orthogonal transform unit 402.

An inverse quantization unit 404 and an inverse orthogonal transform unit 405 decode the quantization result of the quantization unit 403 by inverse-quantizing and inverse-orthogonal-converting. By the decoding processing, a difference value equivalent to the difference value calculated in the reproduction apparatus can be locally calculated. An adder 406 adds the difference value calculated in the inverse quantization unit 404 and the inverse orthogonal transform unit 405, and a reference pixel value. Thus, a pixel value that indicates a locally decoded image can be obtained. The pixel value obtained by the adder 406 is output to an intra prediction unit 407, and stored in a frame memory 409 via a loop filter 408. The loop filter 408 is used to remove a noise in a macro-block boundary part of the locally decoded image.

In a case where the intra prediction is used for coding, based on the pixel value input from the adder 406, the intra prediction unit 407 generates a predetermined reference value based on the H.264 standard, which is used to compare adjacent macro-blocks. When a switch 412 is selected at the intra prediction unit 407 side, the reference pixel value output from the intra prediction unit 407 is input in the subtractor 401. Thus, by calculating the difference value between the pixel values of the adjacent macro-blocks included in the input image and the reference pixel value, coding which will be described below is implemented.

In a case where the interprediction is used for coding, a motion detection unit 410 refers to a locally decoded image (reference image) in a preceding frame or field stored in the frame memory 409. Then, based on a pixel value of the reference image, a motion vector of each macro-block in a succeeding frame or field is calculated. When a switch 412 is selected at a motion compensation unit 411 side (inter prediction side), the motion compensation unit 411 outputs a pixel value within a range indicated by the motion vector calculated in the motion detection unit 410 as a reference pixel value, to the subtractor 401. The subtracter 401 calculates a difference value between the pixel value of the macro-block in the succeeding frame or field and the reference pixel value, so that coding which will be described below is implemented.

An entropy-coding unit 413 entropy-codes the quantization result in the quantization unit 403 and the motion vector calculated in the motion detection unit 410, and outputs the coded result as a code stream to a multiplexing unit 414. The entropy-coding unit 413 can use both methods of the CAVLC method based on Huffman code and the CABAC method using an arithmetic coding.

The buffer occupancy control unit 415 updates an occupancy of a virtual buffer based on a code amount generated by the entropy-coding unit 413. Based on the occupancy of the virtual buffer, the buffer occupancy control unit 415 instructs the quantization unit 403 about a target code amount of a next picture. The virtual buffer is a virtual buffer in a decoder. In the buffer occupancy control unit 415, occupancy of the virtual buffer is defined based on a code amount generated in an entropy-coding and an output code amount.

Figure 5A:
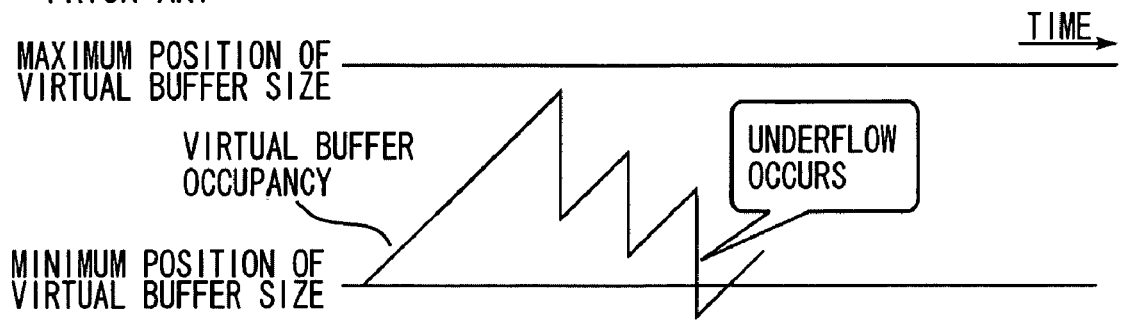
FIG. 5A is a schematic view illustrating an example when an underflow occurs in a virtual buffer.
Figure 5B:
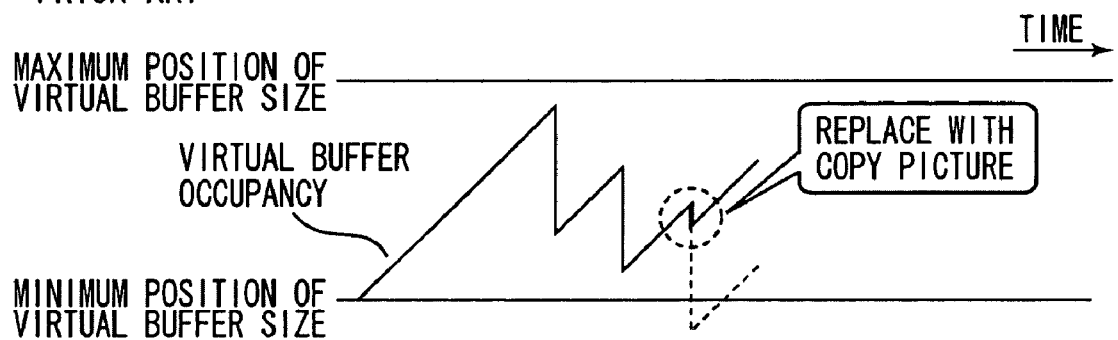
FIG. 5B is a schematic view illustrating an example of an occupancy of a virtual buffer when an underflowed picture is replaced with a copy picture.
Figure 6:
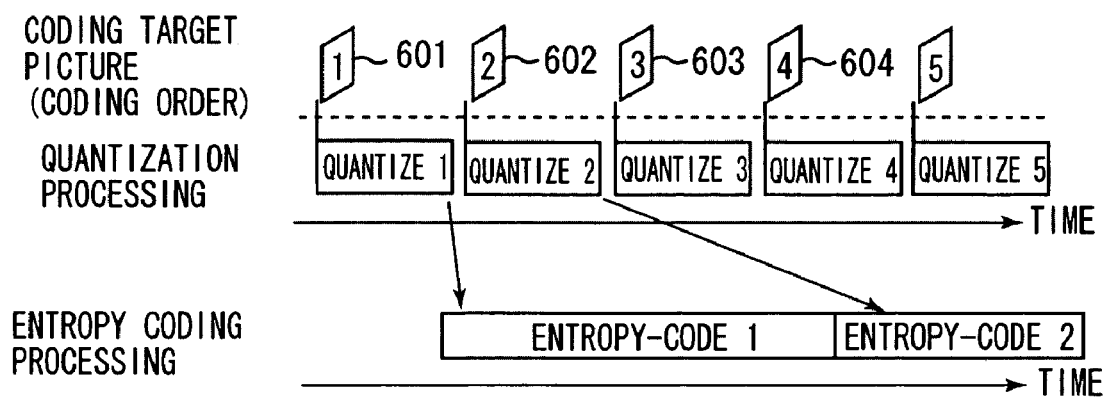
FIG. 6 is a schematic view illustrating timing of each processing in a case where quantization processing and entropy-coding processing are asynchronously performed.

As illustrated in FIG. 5A, when the occupancy falls below a minimum position of the size of the virtual buffer, an underflow occurs in the virtual buffer. A copy picture generation unit 416, when the underflow occurs in the virtual buffer, replaces a target entropy-coding picture at the time with a copy picture that is the same as a picture coded immediately before the entropy-coding. The copy picture has only information that is the same as the other pictures.

Further, in the first exemplary embodiment, the copy picture generation unit 416 also replaces one or a plurality of succeeding pictures that refer to the picture replaced with the copy picture due to the underflow in the virtual buffer for the inter picture prediction, with the copy picture. Then, the multiplexing unit 414 multiplexes the copy picture generated in the copy picture generation unit 416 in the code stream, instead of the replacement target picture. In the case where the picture is replaced with the copy picture, the buffer occupancy control unit 415 updates the occupancy of the virtual buffer based on the generated code amount of the copy picture.

The multiplexing unit 414 further multiplexes an audio stream generated in an audio coding unit (not shown) on the stream (video stream) which is entropy-coded in the entropy-coding unit 413 and outputs the multiplexed stream as code stream suitable for recording, to an recording device, or the like.

Figure 4:
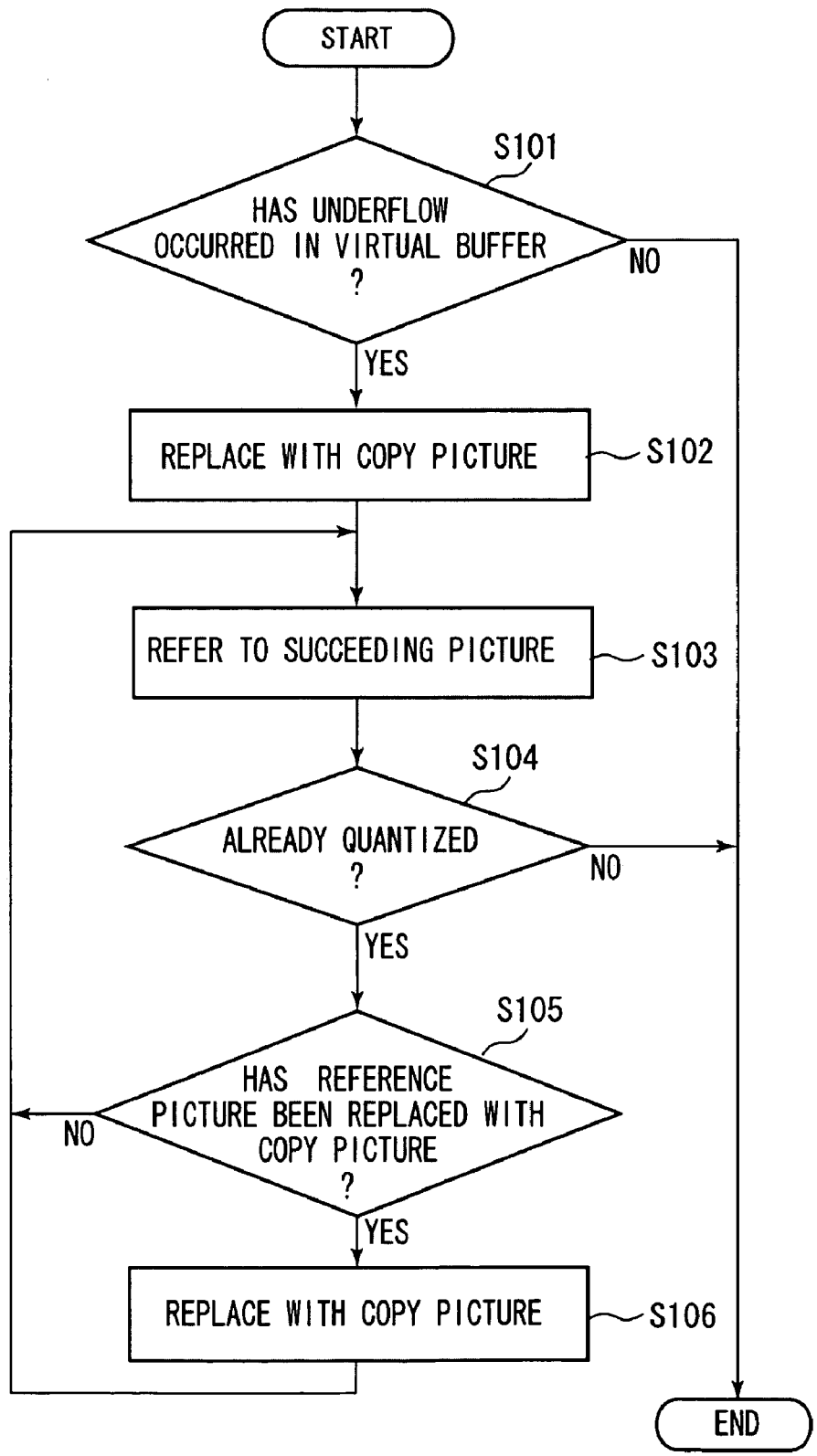
FIG. 4 is a flowchart illustrating copy picture replacement processing according to the first exemplary embodiment of the present invention.

FIG. 4 is a flowchart illustrating copy picture replacement processing according to the first exemplary embodiment of the present invention. With reference to FIG. 4, the copy picture replacement processing in a case an underflow occurs in a virtual buffer is described below.

In step S101, the buffer occupancy control unit 415 determines whether an occupancy is decreased and an underflow occurs in a virtual buffer. If the underflow occurs in the virtual buffer (YES in step S101), the processing proceeds to step S102. If the underflow does not occur in the virtual buffer (NO in step S101), the copy picture replacement processing is finished.

In step S102, the copy picture generation unit 416 replaces the underflowed picture with a copy picture. In step S103, the buffer occupancy control unit 415 refers to succeeding pictures that are to be quantized or already quantized next to the target picture in step S102, S105, or S106.

In step S104, the buffer occupancy control unit 415 determines whether the succeeding pictures referred to in step S103 have already been quantized (or being quantized). If the pictures have already been quantized (or being quantized) (YES in step S104), the processing proceeds to step S105. If the succeeding pictures have not yet been quantized (or not being quantized) (NO in step S104), the copy picture replacement processing is finished.

In step S105, the buffer occupancy control unit 415 determines, in the succeeding pictures referred to in step S103, whether a picture to be coded (original image) corresponding to a reference picture referred at the time of a motion vector detection is replaced with a copy picture. If the picture to be coded is replaced with the copy picture (YES in step S105), the processing proceeds to step S106. If the picture to be coded is not replaced with the copy picture (NO in step S105), the processing returns to step S103.

In the case where the picture to be coded (original image) corresponding to the reference picture is replaced with the copy picture, if the picture to be coded is directly coded, the same picture as the picture referred to at the time of the coding is not obtained in decoding. This causes a decode error or an image deterioration. Accordingly, in step S106, the copy picture generation unit 416 replaces the succeeding pictures referred to in step S103 with the copy pictures. Because the succeeding pictures are replaced with the copy pictures, the entropy-coding unit 413 does not perform entropy-coding processing on the succeeding pictures that have already been quantized. Then, the processing returns to step S103.

FIGS. 2A to 2F are schematic views illustrating relationships between references of pictures and copy picture replacement processing for each picture type when an underflow occurs in a virtual buffer according to the first exemplary embodiment of the present invention. The copy picture replacement processing of each picture type is described with reference to FIGS. 2A to 2F.

Figure 2A:
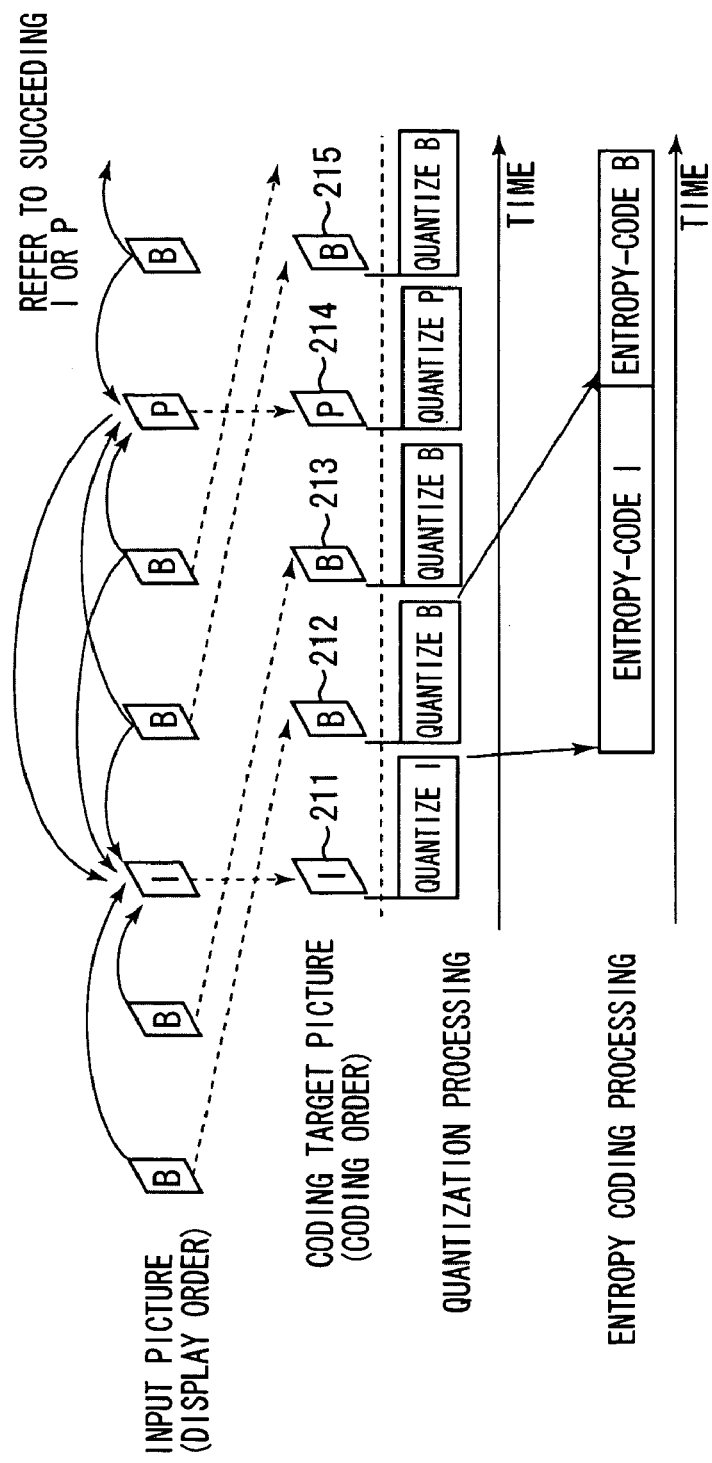
FIGS. 2A and 2B are views illustrating an example of a copy picture replacement processing that is performed when an underflow occurs in a virtual buffer in an entropy-coding of an I picture according to the first exemplary embodiment of the present invention.
Figure 2B:
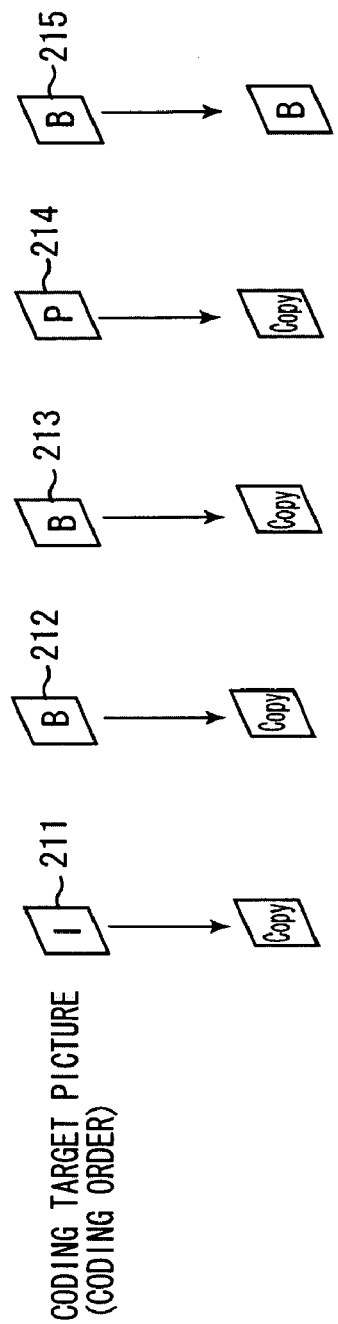

FIGS. 2A and 2B are views illustrating a copy picture replacement processing that is performed when an underflow occurs in a virtual buffer in an entropy-coding of an Intra (I) picture 211. Similarly, FIGS. 2C and 2D are views illustrating a copy picture replacement processing in a case of a Predictive (P) picture 221, and FIGS. 2E and 2F are views illustrating a copy picture replacement processing in a case of a Bi-directional predictive (B) picture 231.

FIG. 2A shows that input pictures that are input in a display order are reordered in a coding order, and coding target pictures are quantized and entropy-coded. FIG. 2A illustrates an example that the coding target pictures are quantized in the order of the I picture 211, a B picture 212, a B picture 213, a P picture 214, and a B picture 215. Meanwhile, the entropy-coding processing is performed in the order of the quantized I picture 211, and the quantized B picture 212 asynchronously with the quantization in irregular processing intervals.

When an underflow occurs in the I picture 211, the occurrence of the underflow is confirmed at the time the entropy-coding processing is finished. Accordingly, in the example illustrated in FIG. 2A, succeeding pictures whose quantization has already been started or completed by the time the underflow of the I picture 211 is confirmed, that is, during the entropy-coding of the I picture 211, are the three pictures of the B picture 212, the B picture 213, and the P picture 214.

With respect to the reference relationship of the pictures, all of the three succeeding pictures (the B picture 212, the B picture 213, and the P picture 214) refer to the I picture 211 that underflowed. Accordingly, as illustrated in FIG. 2B, if the I picture 211 is replaced with a copy picture, the copy picture generation unit 416 replaces also the three succeeding pictures (the B picture 212, the B picture 213, and the P picture 214) with the copy pictures. The B picture 215 can refer to the P picture 214 that is replaced with the copy picture. However, the B picture 215 may also refer to only the next I picture or the next P picture.

In FIG. 2C, input pictures that are input in a display order are reordered in a coding order, and coding target pictures are quantized and entropy-coded. FIG. 2C illustrates an example that the coding target pictures are quantized in the order of the P picture 221, a B picture 222, a B picture 223, a P picture 224, and a B picture 225. Meanwhile, the entropy-coding processing is performed in the order of the quantized I picture 221, and the quantized B picture 222 asynchronously with the quantization in irregular processing intervals.

When an underflow occurs in the P picture 221, the occurrence of the underflow is confirmed at the time the entropy-coding processing is finished. Accordingly, in the example illustrated in FIG. 2C, succeeding pictures whose quantization has already been started or completed by the time the underflow of the P picture 221 is confirmed, that is, during the entropy-coding of the P picture 221, are the three pictures of the B picture 222, the B picture 223, and the P picture 224.

In the reference relationship of the pictures, all of the three succeeding pictures (the B picture 222, the B picture 223, and the P picture 224) refer to the P picture 221 that underflowed. Accordingly, as illustrated in FIG. 2D, if the P picture 221 is replaced with a copy picture, the copy picture generation unit 416 replaces also the three succeeding pictures (the B picture 222, the B picture 223, and the P picture 224) with the copy pictures. The B picture 225 can refer to the P picture 224 that is replaced with the copy picture. However, the B picture 225 may also refer to only the next I picture or the next P picture.

In FIG. 2E, input pictures that are input in a display order are reordered in a coding order, and coding target pictures are quantized and entropy-coded. FIG. 2E illustrates an example that the coding target pictures are quantized in the order of the B picture 231, a B picture 232, a P picture 233, a B picture 234, and a B picture 235. Meanwhile, the entropy-coding processing is performed in the order of the quantized B picture 231, and the quantized B picture 232 asynchronously with the quantization in irregular processing intervals.

When an underflow occurs in the B picture 231, the occurrence of the underflow is confirmed at the time the entropy-coding processing is finished. Accordingly, in the example illustrated in FIG. 2E, succeeding pictures whose quantization has already been started or completed by the time the underflow of the B picture 231 is confirmed, that is, during the entropy-coding of the B picture 231, are the three pictures of the B picture 232, the P picture 233, and the B picture 234.

However, in the reference relationship of the pictures, any of the three succeeding pictures (the B picture 232, the P picture 233, and the B picture 234) do not refer to the B picture 231 that underflowed. Accordingly, as illustrated in FIG. 2F, the copy picture generation unit 416 replaces only the B picture 231 with a copy picture, and does not replace the three succeeding pictures with the copy picture.

As described above, in the first exemplary embodiment of the present invention, the copy picture generation unit 416 replaces the coding target picture at the time the underflow occurs in the virtual buffer, with the copy picture. Further, the copy picture generation unit 416, among the succeeding pictures that refer to the coding target picture replaced with copy picture, replaces one or a plurality of the succeeding pictures whose quantization in the quantization unit 403 have already been started or completed, with the copy picture. Thus, an erroneous motion compensation can be prevented and a deteriorated image is not displayed. Further, even if an underflow occurs in a virtual buffer, real-time coding of a moving image can be continued without performing a quantization of succeeding pictures again. Thus, a suitable video image can be provided to users.

As a second exemplary embodiment of the present invention, processing to suppress a code generation amount in a case where an underflow occurs in a virtual buffer in an entropy-coding processing of an I picture is described. A configuration of a moving image coding apparatus according to the second exemplary embodiment is similar to the first exemplary embodiment. Accordingly, a description of the configuration will be omitted.

According to the second exemplary embodiment, in a case where an underflow occurs in a virtual buffer in an entropy-coding processing of an I picture, the buffer occupancy control unit 415 controls the quantization unit 403 to suppress code generation amounts of succeeding pictures such that an underflow does not occur again in the virtual buffer in the entropy-coding processing of a next I picture. More specifically, if the underflow occurs in the virtual buffer, the buffer occupancy control unit 415 forcefully changes quantization parameters in the quantization unit 403 to increase a quantization step size.

Figure 3A:
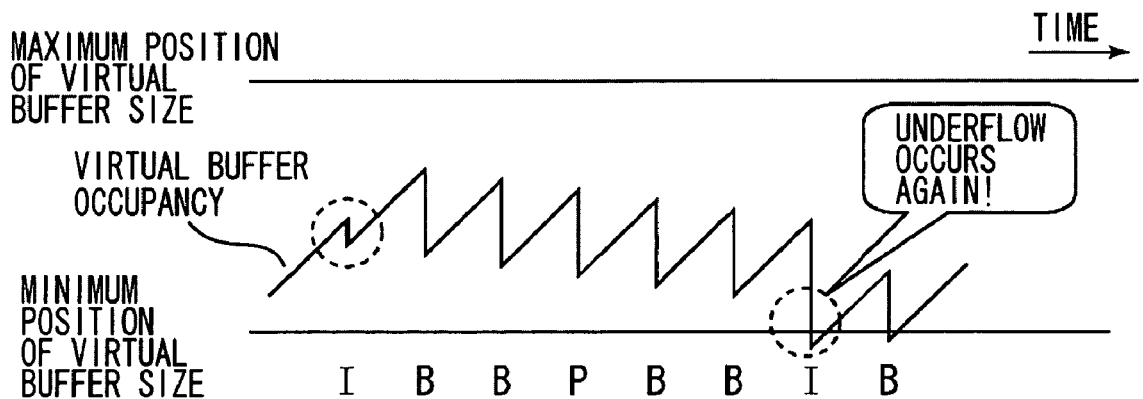
FIGS. 3A and 3B are views illustrating an example of an occupancy of a virtual buffer according to a second exemplary embodiment of the present invention.
Figure 3B:
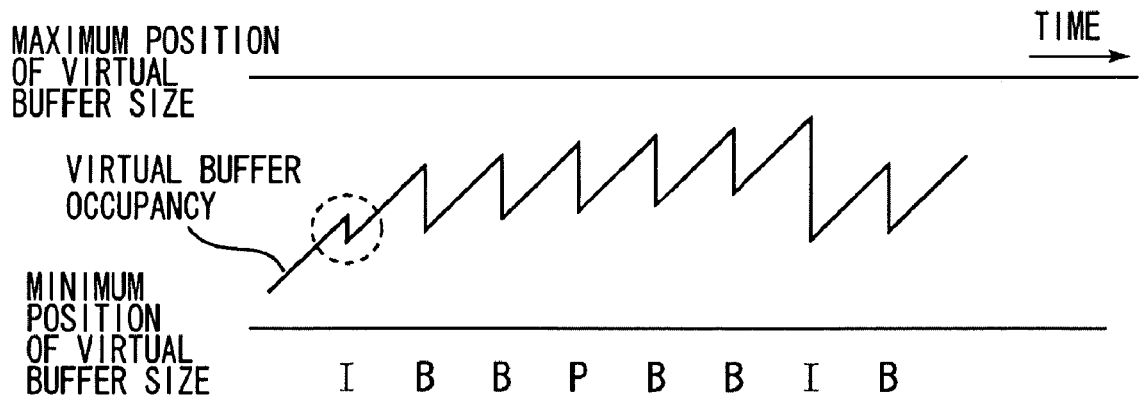

FIGS. 3A and 3B are views illustrating an example of a transition of an occupancy of a virtual buffer. In FIGS. 3A and 3B, a first I picture is replaced with a copy picture because an underflow occurred in a virtual buffer. FIG. 3A is a schematic view illustrating an occupancy in a virtual buffer in a case where control to suppress code generation amounts of succeeding pictures is not performed. FIG. 3B is a schematic view illustrating an occupancy in a virtual buffer in a case where control to suppress code generation amounts of succeeding pictures is performed. In FIGS. 3A and 3B, vertical directions indicate occupancies in a virtual buffer, and horizontal directions indicate the time that individual pictures are output to the multiplexing unit 414. When the occupancy is between a maximum position and a minimum position of the size of the virtual buffer, the state of the buffer is normal. However, when the occupancy is below the minimum position, an underflow occurs in the virtual buffer.

As illustrated in FIG. 3B, by suppressing a code generation amount of each picture after the occurrence of the underflow in the virtual buffer, the occupancy of the virtual buffer is increased so that at the time a next I picture is output, an occurrence of an underflow can be prevented. Accordingly, the I pictures are not successively replaced with the copy picture, and the deteriorated image is not displayed.

In the first exemplary embodiment, in the case where an I picture is replaced with a copy picture, a P picture and/or a B picture that refer to the I picture and have already been quantized or being quantized is replaced with the copy picture. In the second exemplary embodiment, such P picture and/or B picture are replaced with the copy picture, and the quantization unit 403 can be controlled to suppress a code generation amount of succeeding pictures that have not yet been quantized.

For example, in FIG. 2A, at the time the underflow occurs in the virtual buffer, the B picture 215 has not been quantized. Therefore, by controlling the quantization unit 403 to suppress code generation amounts from the B picture 215 to the next I picture, the I pictures are not successively replaced with the copy picture. Further, the deteriorated image is not displayed.

Each unit that forms the moving image coding apparatus according to the above-described exemplary embodiments can be implemented by executing a program stored on a random access memory (RAM), a read-only memory (ROM), or the like in a computer. In such a case, the program and the computer-readable recording medium that stores the program constitute the present invention.

The present invention can be applied, for example, to a system, an apparatus, a method, a program, or a storage medium. More specifically, the present invention can be applied to a system including a plurality of devices or an apparatus consists of a single device.

Further, in the present invention, a program (i.e., the program corresponding to the flowchart illustrated in FIG. 4 in the exemplary embodiment) of software implementing each step in the above-described moving image coding method can be directly, or remotely provided to a system or an apparatus. Then, a computer in the system or the apparatus can read and execute the provided program code.

Accordingly, the program code itself that is installed on the computer to implement the functional processing according to the exemplary embodiments constitutes the present invention. That is, the present invention includes the computer program that implements the functional processing according to the exemplary embodiments of the present invention.

In such a case, if the function of the program is implemented, any form can be employed, for example, an object code, a program implemented by an interpreter, or a script data to be supplied to an operating system (OS).

As the recording medium for supplying such a program, various recording media, for example, a floppy disk, a hard disk, an optical disk, a magneto-optical disk (MO), a compact disk read-only memory (CD-ROM), a compact disk recordable (CD-R), and a compact disk rewritable (CD-RW) can be employed. Further, a magnetic tape, a nonvolatile memory card, a ROM, and a digital versatile disk (DVD) (DVD-ROM, DVD-R) can be employed.

In addition, the program can be supplied by connecting to a home page (website) in the Internet using a browser in a client computer. Then, the computer program can be supplied from the home page by downloading the computer program itself according to the exemplary embodiments of the present invention or a compressed file including an automatic installation function into a recording medium such as a hard disk.

Further, the program code constituting the program according to the exemplary embodiments of the present invention can be divided into a plurality of files, and each file can be downloaded from different home pages. More specifically, a WWW server that allows downloading of the program file to a plurality of users for realizing the functional processing according to the exemplary embodiments of the present invention in the computer, is also included in the present invention.

Further, the program according to the exemplary embodiments of the present invention can be encrypted and stored on a storage medium such as a CD-ROM, and distributed to the users. A user who has cleared prescribed conditions is allowed to download key information for decrypting from a home page through the Internet. Using the key information, the user can execute the encrypted program, and the program is installed onto the computer.

Further, the function according to the exemplary embodiments described above can be implemented not only by executing the read program code by the computer, but also by executing a part or the whole of the actual processing using an OS working on the computer, or the like.

Further, the program code read from the storage medium can be written in a memory which is provided in a function enhancing board inserted in the computer or in a function enhancing unit connected to the computer. Then, based on an instruction according to the program code, the CPU or the like provided in the function enhancing board or in the function enhancing unit executes a part or the whole of the actual processing to realize the function according to above-described exemplary embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-316237 filed on Dec. 6, 2007, which is hereby incorporated by reference herein in its entirety.

What is claimed is:

1. A moving image coding apparatus configured to perform coding using inter picture prediction, the moving image coding apparatus comprising:
   a quantization unit configured to quantize a difference value between input image data and prediction image data;
   a coding unit configured to perform an entropy-coding of the difference value quantized by the quantization unit;
   a buffer occupancy control unit configured to update an occupancy of a virtual buffer that is a virtual buffer in a decoder based on a code amount generated by the coding unit, and control the quantization unit based on the occupancy of the virtual buffer; and
   a copy picture generation unit configured to replace a first picture with a copy picture if the occupancy of the virtual buffer is below a predetermined position when the first picture is coded by the coding unit, and replace, among succeeding pictures that refer to a reference image corresponding to the first picture for the inter picture prediction, a second picture whose quantization has been started or completed by the quantization unit, with the copy picture,
   wherein the buffer occupancy control unit controls the quantization unit such that code generation amounts of the succeeding pictures that have not yet been quantized are suppressed until a next Intra picture is quantized in a case where, as the first picture, the Intra picture is replaced with the copy picture.

2. The moving image coding apparatus according to claim 1, wherein the copy picture generation unit replaces the first picture with the copy picture in a case where an underflow occurs in the virtual buffer.

3. The moving image coding apparatus according to claim 1, wherein the coding unit does not perform an entropy-coding on the second picture that is replaced with the copy picture.

4. A moving image coding method for performing a coding using inter picture prediction, the moving image coding method comprising:
   quantizing a difference value between input image data and prediction image data;
   entropy-coding the quantized difference value;
   updating an occupancy of a virtual buffer that is a virtual buffer in a decoder based on a code amount generated by the entropy-coding, and controlling the quantization based on the occupancy of the virtual buffer;

replacing a first picture with a copy picture if the occupancy of the virtual buffer is below a predetermined position when the first picture is entropy-coded, and replacing, among succeeding pictures that refer to a reference image corresponding to the first picture for the inter picture prediction, a second picture whose quantization has been started or completed, with the copy picture; and controlling the quantization processing such that code generation amounts of succeeding pictures are suppressed until a next Intra picture is quantized in a case where, as the first picture, the Intra picture is replaced with the copy picture.

5. The moving image coding method according to claim 4, further comprising, replacing the first picture with the copy picture in a case where an underflow occurs in the virtual buffer.

6. The moving image coding method according to claim 4, further comprising, not performing an entropy-coding on the second picture that is replaced with the copy picture.

* * * * *